United States Patent [19]
Schuller

[11] 3,845,470
[45] Oct. 29, 1974

[54] CHECK-CONTROLLED VENDING
[75] Inventor: James T. Schuller, St. Louis, Mo.
[73] Assignee: UMC Industries, Inc., New York, N.Y.
[22] Filed: Feb. 8, 1973
[21] Appl. No.: 330,581

[52] U.S. Cl. .......................... 340/149 A, 340/149 R
[51] Int. Cl. ........................................ H04q 51/00
[58] Field of Search ............... 340/149 A; 179/2 CA

[56] References Cited
UNITED STATES PATENTS
| | | | |
|---|---|---|---|
| 3,727,186 | 4/1973 | Stephenson | 340/149 A |
| 3,743,134 | 7/1973 | Constable | 340/149 A |

*Primary Examiner*—Harold I. Pitts
*Attorney, Agent, or Firm*—Koenig, Senniger, Powers and Leavitt

[57] ABSTRACT

A vending system and method employing so-called checks having information in coded format thereon. As disclosed herein, the checks are in sets, each check carrying a predetermined set identification code for identifying a respective one of the sets. Check-controlled vend apparatus of the system includes check receiver means receiving the checks to effect a vend operation, code reading provision for reading the set identification code of the received check, a set selection means for preselecting a set identification and selectively operable from a location accessible only to authorized personnel to permit a vend operation only in response to receiving a check carrying the preselected set identification code. Code-comparing provision compares the read set identification code with the preselected set identification. If the read set identification code compares correctly with the preselected set identification, a vend operation is effected by a vendor. A retention facility retains the received check upon the vend operation. The disclosure also teaches the provision of such checks carrying in addition a check identification code for identifying checks within each set and the use of a memory to store check identifications for comparison with the check identification code of a received check, thereby to prevent a vend operation if the check identification code of a received check is the same as that of a previously received check.

19 Claims, 2 Drawing Figures

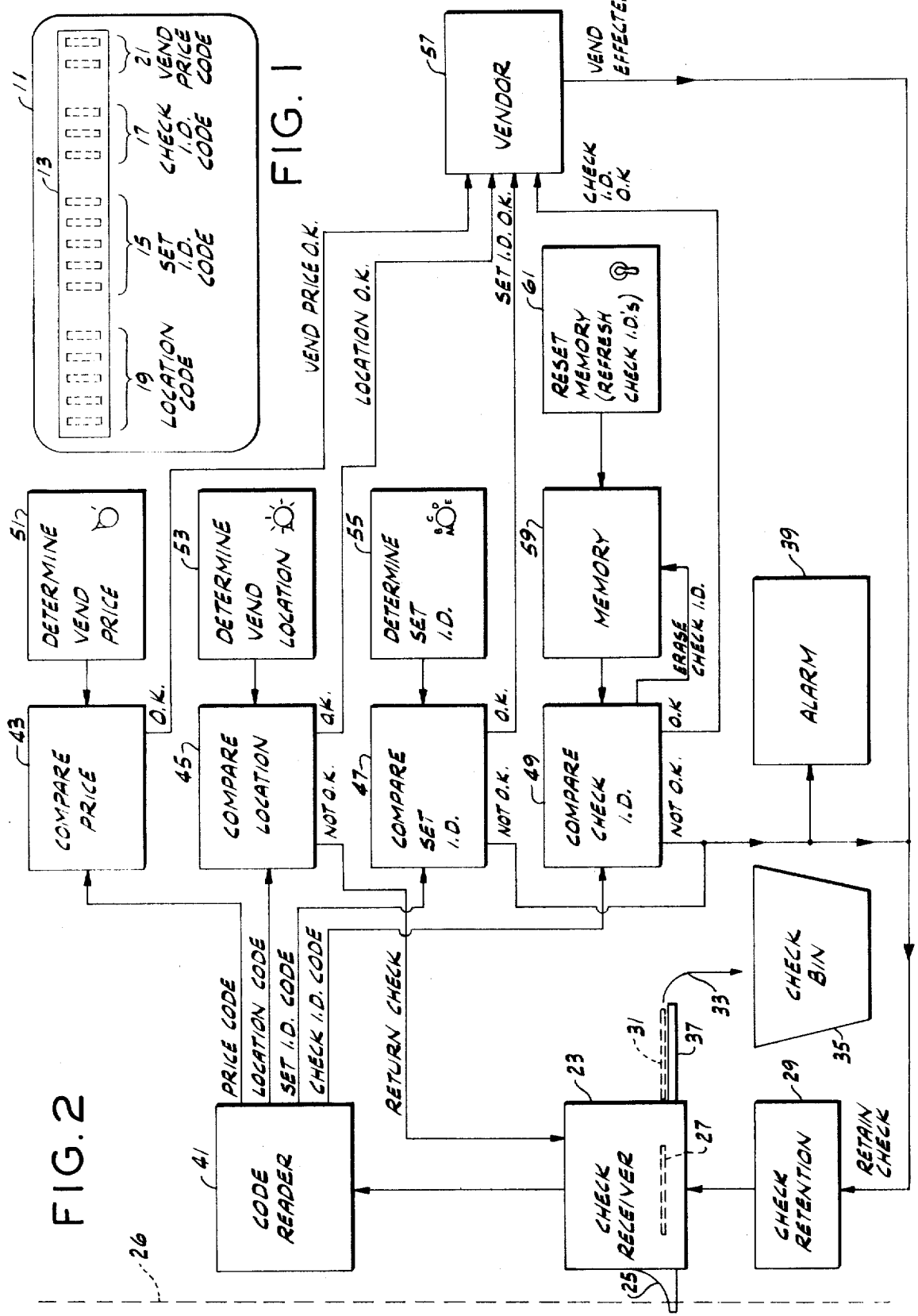

CHECK-CONTROLLED VENDING

BACKGROUND OF THE INVENTION

This invention relates to vending and more particularly to check-controlled vending, i.e., vending under the control of a check, such as a credit card, token, or the like.

It has previously been proposed to control vending with conventional embossed or magnetic-stripe credit cards. For example, U.S. Pat. No. 3,184,714 to Brown et al. discloses a system for vending gasoline under the control of a customer's conventionally embossed credit card. Randall U.S. Pat. No. 3,629,834 teaches a system for dispensing money in response to a bank customer's embossed credit card and keyed entry into the vending control apparatus of his personal identification number. The use of a personal credit card having a magnetic stripe carrying a customer's account number in magnetically encoded form is disclosed by Karecki et al. U.S. Pat. No. 3,651,986, wherein a system is described for vending currency and which updates credit information on the credit card before returning it to the customer.

Prior art credit-card-controlled vending systems of the foregoing types all have the characteristic that the credit card or other so-called check is associated with a particular credit account number, i.e., with an individual customer. Such credit cards or checks are thus personalized and are not useful for a merchandizing situation where it is desirable that a check be used by a customer for only one purchase.

A desirable merchandizing method is to sell or otherwise provide checks to customers for a one-time use, each check then becoming a token or medium of exchange in the nature of scrip which any customer holding the check may use with check-controlled vending apparatus in order to be vended whatever check-controlled unit the check entitles him to receive. In this type of system, which may be referred to as a single-use system, the checks are not personalized, i.e., they are like ordinary money having no association with an individual customer. Such check-controlled vending is disclosed in the copending, coassigned U.S. application Ser. No. 271,213, of William W. Hendrickson, filed July 12, 1972, and entitled Check-Controlled Vending, issued as U.S. Pat. No. 3,774,743, Nov. 27, 1973.

The term "check" is used in the broad sense of any means adapted to be inserted in a vendor for controlling operation of the vendor, and in the same sense as this term is believed to be used in the title of Class 194 of the U.S. Patent Office's Manual of Classification. The term "vendor" is used in the broad sense of any check-controlled unit for dispensing articles, liquids or services.

Simple tokens or ordinary mediums of exchange have certain disadvantages in single-use check-controlled vending systems. For example, they may be easily counterfeited, altered, duplicated or stolen, or may be difficult to handle mechanically, or difficult to control as to number or inventory.

SUMMARY OF THE INVENTION

Among the several objects of the inventnion may be noted the provision of an improved vending system of a check-controlled type and improved methods of vend control; the provision of such a system and methods which are advantageous for single-use check-controlled vending, which simplify merchandizing, and which are substantially immune to counterfeiting, cheating, or the like; the provision of such a system and methods in which checks are employed which if copied without authorization effectively preclude unauthorized vending, and in which checks are easily handled and easily controlled as to number of inventory; and the provision of such a system and methods which significantly increase the risk of detection of one attempting to use a counterfeit check to obtain vending.

Briefly, a vending system according to the invention comprises a plurality of sets of checks, each of the sets having a plurality of checks and each carrying a predetermined set identification code for identifying a respective one of the sets. The system includes check-controlled vend apparatus comprising means for receiving one of the checks to effect a vend operation, means for reading the set identification code of a received check, and set selection means for preselecting a set identification and selectively operable from a location accessible only to authorized personnel. This set selection means is adapted to permit a vend operation only in response to receiving a check carrying the preselected set identification code. Means is provided for comparing the read set identification code with the preselected set identification. This apparatus includes vend means, controlled by the comparing means, for effecting a vend operation only if the read set identification code compares correctly with the preselected set identification. The apparatus also includes means for retaining the received check if a vend operation is effected.

The checks may each also carry a check identification code for identifying the respective check within each set. Each of the check identification codes of the checks in a respective set is different from any other check identification code of another card in the respective set. The check-controlled vend apparatus then further comprises means for reading the check identification code of a received check and a memory for storing check identifications corresponding to check identification codes. This memory is responsive to the reading of the check identification code of a received check effecting a vend operation. Means is included for comparing stored check identifications with check identification codes of received checks. Means is controlled by the comparing means such as to prevent a vend operation if the check identification code of a received check is the same as the check identification code of a previously received check.

Preferably, the check retaining means includes provision for identifying a last-received check for inspection for authorized personnel. Such an arrangement prevents confusion of the last-received check with previously received checks.

As a method of vend control, the invention involves receiving a check from one of a plurality of sets of checks each of which carries a set identification code, electronically reading the set identification code of a received check, preselecting a set identification to permit a vend operation only in response to receiving a check carrying the set identification code corresponding to the preselected set identification and electronically comparing the read set identification code with the preselected set identification. A vend operation is then initiated if the read set identification code compares correctly with the preselected set identification. The received check is then retained if the vend operation is effected.

Other objects and features will be in part apparent and in part pointed out hereinafter.

BRIEF DESCRIPTION OF THE DRAWINGS

FIG. 1 is a front elevation of a card-like check employed in a system of the invention and adapted to have encoded information recorded thereon in a magnetic stripe format; and FIG. 2 is a block diagram of the present system.

DESCRIPTION OF THE PREFERRED EMBODIMENT

Referring now to the drawings, a check for use in a check-controlled vending system of the invention is indicated at 11. While various forms of checks may be employed, check 11 is shown as of a card-like configuration similar to conventional credit cards which typically are of thin, resilient synthetic resin material. Check 11 is suitably provided with a magnetic stripe 13 comprising a magnetic oxide material so that information may be magnetically recorded on the stripe or in another way applied thereto so that it can be magnetically detected or "read" therefrom. Such information is encoded and may preferably be constituted by characters in binary code. A recording density of 75 binary bits or more per inch may be used, for example.

In accordance with the invention, check 11 carries what may be referred to as a set identification code and preferably also includes a vend location code. Check 11 may also carry what may be referred to as a check identification code and, in addition, a vend price code. Each of these codes may be constituted by one or more digital characters written on magnetic stripe 13 in binary form. Dashed-line representation is used to schematically illustrate a first group of magnetically recorded binary bits 15 constituting the set identification code, a second group of binary digits 17 constituting the check identification code, a third group of binary digits 19 constituting the location code, and a fourth group of binary digits 21 constituting the vend price code.

It is contemplated that checks having the configuration of check 11 will be particularly useful for single-use check-controlled vending. In such single-use vending, a customer may purchase from a merchant one or more such checks. The customer may then use the checks 11 for a vend operation, e.g., in conjunction with a vending machine within a store.

In this single-use context, the purposes of the encoded information carried by check 11 can be understood as follows: the set identification code 15 identifies a respective one of a plurality of sets of checks, with each set having many cards, such as 500. Accordingly, each set of checks is individually identified. If desired, each of the checks 11 within each set may be identified by the check identification code 17, it being understood that each of the check identification codes of the checks in a respective set is different from any other check identification code of another card in the respective set. As an example, there may be five sets of checks, each set having 500 checks. The set identification codes may be represented by the letters A through E and the check identification code for checks within each set may be represented by numbers from 1 through 500. The vend location code 19 may be regarded as a "machine" or a "store" code which identifies a predetermined vending machine within a store or which may identify a predetermined store location where a check 11 may be used for a vend operation. The vend price code 21 defines the price of a vend operation. Thus different checks 11 may entitle check holders to vend operations of different prices.

It is comtemplated that only one set of checks might be sold or issued within a certain period for use in effecting vend operations. For example, on one day a merchant may sell or issue only checks of set A and on the next day may sell or issue only checks of a different set, e.g., set D. Check-controlled vending of a system of the invention includes means for preselecting the set identification to determine which set of checks may effect a vend operation.

Referring to FIG. 2, check-controlled vend apparatus of the invention comprises a suitable check receiver unit 23 for receiving a check 11 upon insertion into a slot 25 or the like in the face 26 of an enclosure for the apparatus. Upon its insertion, the check 11 is held by check receiver 23 in a so-called escrow position represented in phantom at 27. In the escrow position, check 11 is inaccessible to the person who has deposited it. The check remains in the escrow position until completion of a vend operation.

Associated with check 23 is a suitable check retention means 29 which operates in circumstances explained below to cause the escrow check to be transferred to an identification position outlined in phantom at 31. Upon retention of the next-received check, the check in the identification position 31 is moved as indicated by the dart 33 to a suitable check retention box or bin 35. If not retained following a vend operation, a received check is returned to the depositor and is not moved to the identification position 31. The identification position 31 is symbolically defined in FIG. 2 by suitable support means 37 for holding a check after it is moved from the escrow position 27. It should be understood, of course, that means 37 may be any suitable structure for preventing the last-received check 11 from being commingled with checks in check bin 35 until the next check is received by check receiver 23.

For this purpose, check receiver 23 may include a suitable window or the like which may be viewed upon opening the door or front panel 26 of the vend apparatus enclosure by an authorized person, such as the store manager. If a customer reports that a vend operation has not been satisfactorily effected, or if the store manager is notified by an alarm 39, he may open the vend apparatus enclosure and then view the check in the identification position 31 to determine whether it is a proper or authorized check or whether it is counterfeit, for example.

Also associated with check receiver 23 is a code reader 41 for reading the information which is present in magnetically encoded form on a received check 11. Code reader 41 may be constituted, for example, by conventional structure having one or more magnetic heads such as used with credit cards having a magnetic stripe. Code reader 41 provides the vend price code information to price comparing means 43, the vend location code information to location comparing means 45, the set identification code information to set identification comparing means 47, and the check identification code information to check identification comparing means 49. Each of the comparing means 43, 45, 47 and 49 may comprise, for example, an integrated circuit binary comparator of a commercially available type.

Interconnected with vend price comparing means 43 is suitable means indicated at 51 such as a switch or the like for determining the price of a vend operation in response to receiving a check. Interconnected with the vend location comparing means 45 is a suitable means 53 such as a switch for setting or determining the vend location at which the check carrying the vend location code 19 may be received for a vend operation.

Similarly, interconnected with set identification comparing means 47 is suitable means 55 which is selectively operable for preselecting a set identification to permit a vend operation only in response to receiving a check carrying the preselected set identification code 15. Means 55, which may be simply constituted by a switch having positions corresponding to the set identifications, is suitably located so as to be accessible only to authorized personnel. For example, means 55 may be positioned so that it may be operated only by opening the door or front panel 26 of the vend apparatus enclosure. Thus it will be seen that the set comparing means 47 is operative to compare the set identification code read by code reader 41 from a received check 11 with the set identification preselected by means 55. Means 45 has the function of comparing the location code read from a received check by code reader 41 with the vend location established by means 53. Similarly also, means 43 has the function of comparing the vend price read from a received card by reader 41 with the vend price selected by means 51. Each of the comparing means 43, 45 and 47 is suitably interconnected with a suitable vendor 57 for dispensing goods or the like to the individual who has deposited the check.

Indicated at 59 is a memory for storing a plurality of check identifications corresponding with the check identification codes of each set of checks. Memory 59 may, for example, comprise a commercially available integrated circuit random-access memory for storing such identifications in binary coded format. That is, the check identifications which are constituted by numbers from 1 to 500 may be represented in binary form for storage in memory 59. Memory 59 is responsive to the reading of the check identification code of a received check for effecting a vend operation and may be configured as known to those skilled in the use of such memories so as to store all of the check identifications of the checks of a set to be received. For this purpose, there is indicated at 61 suitable reset means for causing all of the check identifications to be stored at once in memory 59. As each check is received by check receiver 23, the reading of the check identification code causes the corresponding check identification to be erased from memory 59. The comparing means 49 has the function of comparing check identification code read from a received check with those check identifications stored in memory 59. The check identification comparing means 49 is interconnected with vendor 57 so as to prevent a vend operation if the check identification code of a received check is the same as the check identification code of a previously received check.

The check identification comparing means 49 and the set identification comparing means 47 are both connected with alarm 39 so that, if either the set identification code or the check identification code is incorrect, the alarm signal will be given by alarm 39. Alarm 39 may give a signal to a manager of a store where the vending apparatus is located, for example. In addition, an alarm actuation signal from either the check identification comparing means 49 or the set identification comparing means 47 will cause check retention means 29 to retain the received check 11, even though a vend operation is not effected by vendor 57. This enables the store manager or another authorized person to identify the check retained in identification position 31 and to ascertain whether or not a counterfeit or improper check 11 was used in an attempt to obtain a vend operation.

In operation of the system, a method of vend control is involved which comprises, first, receiving at the check receiver means a check 11 having, at least, a set identification code 15. The set identification code on a received check 11 is electronically read by code reader 41 and is electrically compared by means 47 with the set identification preselected by means 55. As noted, means 55 preselects a set identification to permit a vend operation only in response to receiving a check carrying the set identification code corresponding to the preselected vend identification. If the read set identification code compares correctly with the preselected set identification, a "set identification O.K." signal is supplied to vendor 57 for effecting a vend operation. If check 11 includes in addition a vend location code 19, the operation includes the steps of reading by means of code reader 41 the vend location code on the received check, electrically comparing by means 45 the read vend location code with a predetermined vend location as established by means 53, and preventing or inhibiting a vend operation if the vend location code compares incorrectly with the predetermined location. This is accomplished by sending a "location O.K." signal to vendor 57 if the comparison is correct, but by sending a "location not O.K." signal to check receiver 23 to return the check to its depositor if the comparison is incorrect. This is done to ensure that, if the holder of a check suited only for effecting a vend operation at a different machine or store location deposits the check, it will be returned to him without effecting a vend operation.

If a check 11 includes a vend price code 21, the vend price code is electronically read by code reader 41 and supplied to vend price comparing means 43 for comparison with a predetermined vend price as established by means 51. If the comparison between the read price code and the predetermined vend price is correct, a "vend price O.K." signal is supplied to vendor 57 to permit a vend operation to be effected. However, if the comparison is incorrect, the absence of such a signal inhibits vendor 57 from initiating a vend operation.

If a check 11 includes a check identification code 17, such code is magnetically read by code reader 41 and supplied to check identification comparing means 49 for comparison with a plurality of check identifications stored in memory 59. The check identification code read from the received check is then electrically compared by comparing means 49 with the check identification stored in memory 59. Vendor 57 is prevented from effecting a vend operation by the absence of a "check identification O.K." signal supplied thereto by comparing means 49.

If the received check carries a check identification code which is the same as that of a previously received check, comparing means 49 provides a "check identification not O.K." signal to an alarm 39 and to check retention means 29 to retain the received check, so that it can be identified in identification position 31 by an authorized person such as the store manager. As each check identification code is read from a received check, the corresponding check identification is erased from memory 59 so as to prevent a vend operation if a received check carries a check identification code which is the same as that of a previously received check. A check identification thus erased may be said to be cancelled from the memory.

Thus, it will be seen that all of the checks of a set may be received until all of the check identifications are erased from the memory 59. These check identifications may be "refreshed," i.e., once again stored in memory 59, by operation of reset means 61. At the beginning of a day, a store manager may select a new set identification and reset the memory 59 by operation of means 61 so that the apparatus is adapted only to receive checks having the new set identification and to respond only to checks having a proper check identification code.

It should be noted that a received check is retained if the set identification code or the check identification code compares incorrectly with the preselected set identification or with a stored check identification, even though a vend operation is inhibited. In this way, an improper or fraudulent (e.g., counterfeit) check will not only fail to initiate a vend operation, but its further use will be prevented.

It is, therefore, to be seen that while a system of the invention does not prevent the making of counterfeit checks, it significantly increases the risk of detection if it is attempted to use a counterfeit or unauthorized check to obtain a vend operation. Since the set identification may be changed in a random fashion from day to day, a person with a counterfeit check cannot know whether his counterfeit check will cause operation of alarm 39 if he attempts to employ the check for a vend operation. In addition, a would-be counterfeiter runs the risk that the check not only will fail to have the proper set identification code, but will not have a check identification code which is different from that of a previously received check, again operating the alarm. Moreover, anyone attempting to sell counterfeit checks will not be able to give assurance to a would-be purchaser that any single check will function properly if it is used in an attempt to obtain a vend operation. Even if the checks were sold in sets corresponding to the possible sets which are to be received by the vend apparatus, the would-be purchaser would not be able to determine which set could be employed on a given day, and thus would run the risk of being detected.

In view of the above, it will be seen that the several objects of the invention are achieved and other advantageous results attained.

As various changes could be made in the above constructions and methods without departing from the scope of the invention, it is intended that all matter contained in the above description or shown in the accompanyings shall be interpreted as illustrative and not in a limiting sense.

What is claimed is:

1. A vending system comprising a plurality of sets of checks, each of the sets having a plurality of checks each carrying a predetermined set identification code for identifying a respective one of the sets; and check-controlled vend apparatus comprising means for receiving one of said checks to effect a vend operation, means for reading the set identification code of a received check, set selection means for preselecting a set identification and selectively operable from a location accessible only to authorized personnel to permit a vend operation only in response to receiving a check carrying the preselected set identification code, means for comparing the read set identification code with the preselected set identification, vend means, controlled by the comparing means, for effecting a vend operation if the read set identification code compares correctly with the preselected set identification, and means for retaining the received check if a vend operation is effected.

2. A vending system as set forth in claim 1 wherein said means for reading the set identification comprises means for magnetic reading of magnetically encoded characters on a received check.

3. A vending system as set forth in claim 2 wherein the magnetically encoded characters are in a binary code.

4. A vending system as set forth in claim 3 wherein said binary code is in a magnetic stripe format on a received check.

5. A vending system as set forth in claim 1 wherein said checks each carry also a check identification code for identifying the respective check within each set, each of the check identification codes of the checks in a respective set being different from any other check identification code of another card in the respective set, said check-controlled vend apparatus further comprising means for reading the check identification code of a received check, memory means for storing check identifications corresponding to check identification codes and responsive to the reading of the check identification code of a received check for effecting a vend operation, means for comparing stored check identifications with check identification codes of received checks, and means, controlled by said comparing means, for preventing a vend operation if the check identification code of a received check is the same as the check identification code of a previously received check.

6. A vending system as set forth in claim 5 wherein said memory means is adapted to store all of the check identifications of checks of a set to be received, each stored check identification being cancelled in response to reading from a received check the check identification code corresponding to the stored check identification code, and wherein the last-said means for preventing a vend operation is adapted to prevent vend operation if the check identification code of a received check corresponds with a previously cancelled check identification.

7. A vending system as set forth in claim 1 wherein said checks each carry also a price code, said check-controlled vending apparatus further comprising means for reading the price code of a received check, means for comparing the read price code with a vend operation price, and means for preventing said vend operation if the read price code compares incorrectly with the vend price.

8. A vending system as set forth in claim 1 wherein said checks each carry also a vend location code, said check controlled vending apparatus further comprising means for reading the vend location code of a received check, means for comparing the read vend location code with a predetermined vend location, and means for preventing said vend operation if the preselected location and read location code compare incorrectly.

9. A vending system as set forth in claim 1 wherein said means for retaining the received check upon said operation comprises means for identifying a last-received check for inspection by authorized personnel whereby confusion of the last-received check with previously received checks is prevented.

10. A vending system as set forth in claim 9, said check-controlled vend apparatus further comprising a received check storage bin, said means for retaining identifying a last-received check comprising means for keeping the last-received check in an identification position and operative upon retention of a subsequently received check for moving the last-received check from the identification position to the bin.

11. A vending system comprising means for receiving a check, said check comprising one of a plurality of checks, each of the checks of said plurality carrying a check identification code, each check identification code being different from any other check identification code of another check of said plurality, means for reading the identification code of a received check, memory means for storing a plurality of check identifications corresponding to check identification codes of said plurality of checks, said memory means being responsive to the reading of the check identification code of a received check, means for comparing stored check identifications with check identification codes of received checks, and means, controlled by the comparing means, for effecting a vend operation if the check identification code only of a received check is not the same as the check identification code of a previously received check.

12. A vending system as set forth in claim 11 wherein said memory means is adapted to store all of the check identifications of checks to be received, each stored check identification being cancelled in response to reading from a received check the check identification code corresponding to the stored check identification code, and wherein the last-said means for preventing a vend operation is adapted to prevent vend operation if the check identification code of a received check corresponds with a previously cancelled check identification.

13. A vending system comprising means for receiving a check carrying an identification code, means for reading the identification code of a received check, means for effecting a vend operation if the identification code is correct, and means for retaining the received check if a vend operation is effected, said retaining means including means for retaining the last-received check for inspection by authorized personnel whereby confusion of the last-received check with the previously received checks is prevented.

14. A vending system as set forth in claim 13 further comprising a received check storage bin, said means for retaining a last-received check comprising means for keeping the last-received check in an identification position and operative upon retention of a subsequently received check for moving the last-received check from the identification position to the bin.

15. A method of vend control comprising receiving a check from one of a plurality of sets of checks, the checks each having a set identification code, electronically reading the set identification code of a received check, preselecting a set identification to permit a vend operation only in response to receiving a check carrying the set identification code corresponding to the preselected set identification, electronically comparing the read set identification code with the preselected set identification, initiating a vend operation if the read set identification code compares correctly with the preselected set identification, and retaining the received check if said vend operation is effected.

16. A method of vend control as set forth in claim 15 wherein said reading of the set identification code is effected by magnetic reading of binary coded characters.

17. A method of vend control as set forth in claim 15 further comprising electronically reading a price code on a received check, electronically comparing the read price code with a vend price, and inhibiting said vend operation if the read price code compares incorrectly with the vend price.

18. A method of vend control as set forth in claim 15 further comprising electronically reading a vend location on a received check, electronically comparing the read vend location code with a predetermined vend location, and inhibiting said vend operation if the read vend location code compares incorrectly with the predetermined location.

19. A method of vend control as set forth in claim 15 further comprising reading a check identification number on a received check, each of the checks of a set having a different check identification number, electronically storing a plurality of check identifications in a memory, erasing from the memory the check identification corresponding to the check identification number ready from a received check, electronically comparing the check identification code read from a subsequently received check with check identifications stored in said memory, and inhibiting said vending operation if a read check identification code does not compare correctly with one of the check identifications stored in said memory, whereby a vending operation is prevented if a received check carries a check identification code which is the same as that of a previously received check.

* * * * *